United States Patent Office 3,377,285
Patented Apr. 9, 1968

3,377,285
NON-THICKENING OIL CONCENTRATES
James H. Randles, Newton, Chester, England, assignor to Shell Oil Company, New York, N.Y., a corporation of Delaware
No Drawing. Filed May 2, 1966, Ser. No. 546,551
Claims priority, application Great Britain, May 7, 1965, 19,395/65
6 Claims. (Cl. 252—51.5)

ABSTRACT OF THE DISCLOSURE

Mineral oil concentrates containing an oil soluble ester copolymer having a tendency to increase in viscosity and gel are inhibited with respect to increase in viscosity or gelling by the addition of a minor amount of a non-polymerizable nitrogen-containing heterocyclic compound having the unit

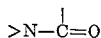

in the molecule.

This invention relates to a particular class of oil-soluble copolymers and mineral oil concentrates and compositions containing said copolymers which generally tend to cause an increase in viscosity or gelation which tendency is inhibited or prevented by addition thereto of a small amount of a non-polymerizable heterocyclic nitrogen-containing compound.

Oil-soluble copolymers of esters of unsaturated carboxylic acids and saturated alkanols having from 4 to 30 carbon atoms and esters of unsaturated carboxylic acids and polyhydric alcohols having from 2 to 6 carbon atoms are excellent detergents for mineral lubricating oils. Such copolymers are normally formed by copolymerizing dissimilar $C_{12-18}$ alkyl carylates and/or methacrylates and $C_{2-6}$ alkyl acrylates and/or methacrylates, the alkyl radical containing at least one free hydroxyl group, preferably on the terminal ($\omega$) carbon atom. However, copolymers of this type and oil concentrates containing them tend to increase in viscosity or gel on standing or in storage or even during use, causing handling, pourability, pumpability and blending problems thereby increasing their cost and restricting their usefulness as fuel and lube oil additives.

It has now been discovered that copolymers of the present invention, mineral oil concentrates and finished mineral oil compositions containing said copolymers can be prevented from increasing in viscosity or gelling by addition thereto of a minor amount (0.1–15% wt.) of a non-polymerizable heterocyclic nitrogen-containing compound having the unit

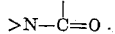

as part of the heterocyclic ring.

Copolymers and oil concentrates containing them which are prevented from increasing in viscosity or gelling are oil-soluble copolymers of esters of unsaturated carboxylic acids and saturated monohydric alcohols having from 4 to 30 carbon atoms and esters of unsaturated carboxylic acids and polyhydric alcohols such as copolymers of $C_{4-30}$ alkyl acrylates and/or methacrylates and $\omega$—HO—$C_{2-6}$ alkyl acrylate and/or methacrylate having a molecular weight range of from about 50,000 to about 5,000,000, preferably between 100,000 and 3,000,000 as determined by the light scattering method. A preferred class of oil-soluble copolymers of the present invention are copolymers made from (1) esters of methacrylic acid and lauryl and/or stearyl alcohols and (2) esters of methacrylic acid and polyhydric alcohols such as ethylene glycol, propylene glycol, erythritol, pentaerythritol, mannitol and the like. The mole ratio of the esters of (1) and their mixtures to the esters of (2) can vary from 10:1 to 2:1 respectively. Copolymers of esters of (1) and (2) can be prepared by any suitable means such as in the presence of an inert hydrocarbon solvent such as benzene or toluene and an organic peroxide or azo catalyst such as benzoyl peroxide or $\alpha,\alpha$-azodiisobutyronitrile and at between 50° C. and 150° C. Another method of preparing copolymers of the present invention is reacting the esters of (1) with an unsaturated carboxylic acid such as acrylic or methacrylic acid to form a copolymer having free acid groups and thereafter reacting the copolymer with an alkylene oxide such as ethylene oxide in the presence of an organic base such as an alkylamine or an alkali compound such as lithium hydroxide.

The following examples illustrate the present invention:

EXAMPLE I

A mixture of stearyl methacrylate, lauryl methacrylate and 2-hydroxyethyl methacrylate in the molar ratio of 5:5:3 in a 72–75% benzene solution, were reacted for about 24 hours, at 80–85° C. in the presence of 0.164% wt. of benzoyl peroxide. The copolymer was washed with methanol, taken up in benzene and freed from the solvents by freeze-drying. The intrinsic viscosity of the copolymer, determined at 98.9° C. in an extracted paraffinic lubricating oil distillate, was 0.65 dl./g.

EXAMPLE II

The procedure of Example I was followed using stearyl methacrylate, lauryl methacrylate and 2-hydroxyethyl methacrylate in the molar ratio of 5:5:4 respectively to form a copolymer having an average molecular weight of 1,500,000.

Other copolymers prepared essentially by the method of Example I are:

III—Copolymer of stearyl methacrylate and 2-hydroxyethyl (10:4) methacrylate (MW=500,000)
IV—Copolymer of an alkyl methacrylate, the alkyl portion obtained from a commercial cut of $C_{12}$ to $C_{18}$ fatty alcohol and 2-hydroxy ethyl methacrylate (10:3) (MW=800,000)
V—Copolymer of butyl methacrylate, lauryl methacrylate, stearyl methacrylate and 2-hydroxyethyl methacrylate (MW=1,000,000)

Another method for preparing copolymers of the present invention is by alkoxylation of a copolymer of $C_{12-18}$ alkyl acrylate and/or methacrylate and mixtures thereof and a free unsaturated acid such as acrylic or methacrylic acid in the presence of an organic amine, e.g., triethylamine or an alkali compound, e.g., lithium hydroxide catalyst at between 50° C. and 150° C. in the presence of an organic solvent such as a mixture of toluene and methanol for about 10–40 hours.

For example, a copolymer of 2-hydroxyethyl methacrylate, lauryl methacrylate and stearyl methacrylate can be prepared by reacting the copolymer of lauryl methacrylate, stearyl methacrylate and methacrylic acid, dissolved in a mixture of 70% w. of toluene and 30% w. of methanol to a concentration of 0.5 milliequivalent of acid per gram solution, with ethylene oxide in a quantity of 1.5–2.0 times the stoichiometric quantity, at a temperature of 110° C. in the presence of 0.03–0.04 equivalent of lithium hydroxide per equivalent of polymeric acid as catalyst.

The following examples illustrate methods of making such copolymers.

EXAMPLE VI

A copolymer of stearyl methacrylate, lauryl methacrylate and methacrylic acid containing these monomers in the molar ratio 5:5:4 and having a molecular weight of 1 million, was converted by reaction with ethylene oxide into a coplymer of stearyl methacrylate, lauryl methacrylate and 2-hydroxyethyl methacrylate as follows:

425 parts by weight of copolymer were dissolved in a mixture of 70% w. of toluene and 30% w. of methanol. The solution obtained contained 42.5 parts by weight of copolymer per 100 parts by weight of solution. The acid content of this solution was 0.525 milliequivalent per gram of solution. To this solution was added 0.7 part by weight of $LiOH.H_2O$, which corresponds with 0.4 part by weight of water-free lithium hydroxide. Subsequently, the temperature of the mixture was raised to 110° C., after which 34.6 parts by weight of ethylene oxide (50% excess) were dissolved in the solution with stirring. The pressure over the solution was 5 atm. abs. The solution was stirred and heated at 110° C. for 20 hours. After 15.5 hours the acid content of the reaction mixture was nil. After cooling a vacuum distillation was performed until a bottom temperature of 100° C. had been reached. The acid value of the copolymer of 2-hydroxyethyl methacrylate obtained was nil, the yield being 448 parts by weight. The lithium content was 0.026% w. According to the analysis no polyoxyethylene groups were present in the copolymer.

EXAMPLE VII

The copolymer of Example VI was prepared in the presence of 0.15% w. of triethylamine rather than using lithium hydroxide and the end product contained 0.037% w. of nitrogen.

EXAMPLE VIII

A copolymer of Example VI was prepared except that the molar ratio of stearyl methacrylate, lauryl methacrylate and methacrylic acid was kept at 5:5:3 respectively.

The present invention is of particular interest in relation to polymer concentrates comprising from 5–75% by weight, and especially from 15–50% by weight, of polymer, and also includes lubricant and fuel oil formulations comprising a polymer concentrate according to the present invention.

The hydrocarbon comprising the polymer concentrate of the present invention may be a single hydrocarbon, e.g., toluene, but will usually be a mixture of hydrocarbons, in particular a mineral oil derived from petroleum lubricating oil fractions are preferred, especially lubricating oil fractions suitable for incorporation in substantial amounts in lubricant formulations comprising polymer concentrates in accordance with the present invention.

Exemplary of compounds wherein the unit

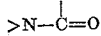

forms part of a heterocyclic ring and which are useful for the purposes of the present invention are compounds having the following generalized structures:

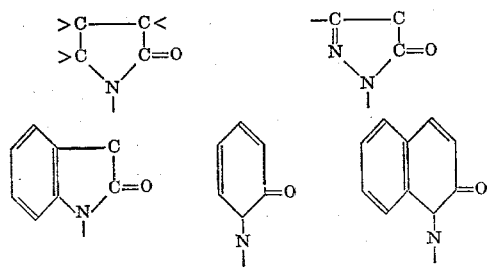

As indicated above, compounds wherein the unit

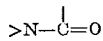

forms part of a heterocyclic ring must be hydrocarbon soluble. Subject thereto, the aforesaid heterocyclic compounds may be unsubstituted or may be substituted on nitrogen or carbon atoms by alkyl, aryl, alkaryl, aralkyl or cycloalkyl radicals. Specific compounds useful as antigelling agents include 2-pyrrolidone, N-methyl-2-pyrrolidone, N-ethyl-2-pyrrolidone, N-butyl-2-pyrrolidone, N-isopropyl-2-pyrrolidone, N-tetradecyl-2-pyrrolidone, 5-methyl-N-methyl-2-pyrrolidone, 1-phenyl-3-methyl-5-pyrazolone, 1-phenyl-2,3-dimethyl-5-pyrazolone, 2-pyridone, N-methyl-pyridone, N-ethyl-pyridone, N-butyl-pyridone, N-isopropyl-pyridone, N-tetradecyl-2-piperidone, N-methyl-caprolactam, 3-ethyl-1-methyl-oxindole, N-methyl quinolone and mixtures thereof.

The concentration in which the polar compounds are applied may vary within wide limits, dependent on the nature, the structure and the molecular weight both of the polar compounds to be applied and of the polymers present in the polymer composition, and of the degree of viscosity decrease required. In some cases as little as 0.1% wt. calculated on polymer composition suffices to attain the desired decrease in viscosity. In most cases a quantity of 15% wt. is amply sufficient. Amounts in the range 0.2 to 10% wt. especially 0.2 to 5% wt. are preferred, although amounts greater and lesser than those mentioned above are not thereby excluded.

Dependent on the purpose for which the polymer compositions are required they may contain, in addition to the polymers, the hydrocarbons and the polar compounds, various additives which are generally added to polymer compositions or to lubricant formulations.

The present invention will now be illustrated, by way of example, with reference to the following test procedures wherein the following terms are used:

Test procedures (a) Relative fluidity coefficient test

This test, which in another aspect of the present invention provides a simple way of selecting the more useful polar compounds from among such as are miscible with the mixture of polymers and hydrocarbons, have an average molecular weight lower than that of the polymer molecules and contain at least one oxygen, sulfur, nitrogen or phosphorus containing group, is carried out at a temperature of 20° C. and comprises comparing the time required for a specified glass ball to fall through a mixed quantity of polymer concentrate contained in a specified glass tube with the time required for the same ball to fall through the same quantity of polymer concentrate containing a polar compound of the aforesaid kind. The comparison is expressed as a ratio herein called the "relative fluidity coefficient." The more useful polar compounds of the aforesaid kind are such that when tested in a polymer concentrate of the kind defined at an amount in the range 0.1 to 15% wt. the polymer concentrate has a relative fluidity coefficient not exceeding a value of 0.7. Preference is given to polar compounds of the aforesaid kind which when tested in a polymer concentrate of the kind defined at a concentration in the range 0.2 to 10%, are such that the polymer concentrate has a relative fluidity coefficient not exceeding a value of 0.5.

Details of the test procedure are as follows: a pour point tube (I.P. Standards for Petroleum and its Products—Method No. 15/60) having engraved thereon a reference mark 55 mm. from the inside surface of the bottom of the tube is filled with a polymer concentrate of the kind defined and allowed to stand overnight at a temperature of 20° C. A glass ball of diameter 10 mm. is then released from a central position in which it just touches the surface of the concentrate, and allowed to fall freely through the concentrate. A stop watch is started when the underside of the ball crosses the reference mark and stopped when the underside of the ball just touches the bottom of the tube. The mean value of several such times is preferably taken. The procedure is repeated for the concentrate containing between 0.1 to 15% wt. of a polar compound of the aforesaid kind.

(b) Mobility test

In this test the time taken for 50 ml. of a polymer concentrate of the kind defined to flow through an efflux aperture 1 cm. in diameter in a tar viscometer at a temperature of 25° C. is measured. The measurement is then repeated immediately after vigorous stirring of the polymer concentrate, the two measurements thereby giving an indication of the effect of polar compounds of the aforesaid kind on the mobility of the polymer concentrate in the normal and in the worked condition.

EXAMPLES 1 AND 2

Relative fluidity coefficients for a number of polar compounds of the aforesaid kind are set forth in Table I; the values given relating to an amount of 0.25% wt. of polar compound in a polar concentrate containing 22.6% wt. of Example VI copolymer in HVI 55 oil.

TABLE I

| Example No. | Polar Compound | Relative Fluidity Coefficient |
|---|---|---|
| 1 | N-methyl pyrrolidone | 0.3 |
| 2 | N-methyl pyrrolidone (1.5% wt.) | 0.02 |

The results obtained for polymer concentrates of the kind defined comprising polar compounds of the aforesaid kind when subjected to the aforementioned mobility test are set forth in Table II. The base oil used was an HVI 55 oil. Different batches of Examples of I, II, VI, VII and VIII copolymers were used, concentrates not containing polar compounds of the aforesaid kind being included by way of comparison as shown by Examples 3–26.

concentrate not in accordance with the present invention.

EXAMPLE 27

Composition of Lubricant A

| | | |
|---|---|---|
| Polymer concentrate (inventive) consisting of Example VI copolymer | percent | 20 |
| HVI–55 base oil | do | 80 |
| 2% N-methyl pyrrolidone | percent wt | 7.5 |
| Tritolyl phosphate | do | 1.0 |
| 4,4'-methylene-bis(2,6-ditert-butyl phenol) | do | 0.75 |
| Base oil (mixture of HVI–65 and HVI–160 oil) | percent wt | 90.75 |

EXAMPLE 28

Composition of lubricant B

| | | |
|---|---|---|
| Polymer concentrate (non-inventive) consisting of Copolymer N-vinyl pyrrolidone C$_{12-18}$ alkyl methacrylate (MW=100,000–700,000) | percent | 30 |
| 70% HVI–55 base oil | percent wt | 4.5 |
| Tritolyl phosphate | do | 1.0 |
| 4,4' - methylene - bis(2,6 - ditert - butyl phenol) | percent wt | 0.75 |
| Base oil (mixture of HVI–65 and HVI–160 oils) | percent wt | 90.75 |
| Both lubricants contained the same weight of polymer | percent wt | 1.5 |

Each lubricant was used to lubricate an Austin A55 test engine operated under high temperature test conditions, which comprised running the engine for 5 periods of 5 hours each with 1 hour shut down intervals between each 5 hour period, at a speed of 3600 r.p.m., a sump oil temperature of 125° C. and a brake load of 3.8 lbs. At the end of the test period the engine was partially dismantled and the pistons examined for cleanliness and rated visually in accordance with an arbitrary cleanli-

TABLE II

| Example No. | Polymer concentrate | | | Polar Compound | | Time of efflux of 50 ml. in sec. at 25° C. | |
|---|---|---|---|---|---|---|---|
| | Type Copolymer | Amount, percent wt. | Percent wt. HVI-55 base oil | Amount percent wt. on concentrate | Description | Normal | After stirring |
| 3 | Ex. VI | 20 | 80 | 1.5 | N-methyl pyrrolidone | 208 | 136 |
| 4 | Ex. VI | 20 | 80 | 1.0 | do | 160 | 185 |
| 5 | Ex. VI | 20 | 80 | 1.5 | do | 61 | 66 |
| 6 | Ex. VI | 20 | 80 | 2.0 | do | 35 | 34 |
| 7 | Ex. II | 20 | 80 | 1.0 | 2-pyrrolidone | 54 | 59 |
| 8 | Ex. VI | 20 | 80 | 2.0 | N-methylpyrrolidone | 37 | 37 |
| 9 | Ex. VI | 20 | 80 | 2.0 | 5-methyl-N-methyl pyrrolidone | 83 | 83 |
| 10 | Ex. VII | 20 | 80 | 1.6 | N-tetradecyl-2-piperidone | 675 | (¹) |
| 11 | Ex. VII | 20 | 80 | 2.0 | N-methyl caprolactam | 63 | 63 |
| 12 | Ex. VI | 20 | 80 | 2.0 | 2,2,6,6-tetramethyl-4-piperidone | 518 | (¹) |
| 13 | Ex. II | 20 | 80 | 2.0 | 3-ethyl-1-methyl oxindole | 1,260 | (¹) |
| 14 | Ex. VI | 20 | 80 | 2.0 | Pyridine-3,5-diethyl-2-propyl-N-oxide | 134 | 135 |
| 15 | Ex. I | 30 | 70 | 1.5 | N-methyl pyrrolidone | 166 | 175 |
| 16 | Ex. I | 30 | 70 | 2.0 | do | 108 | (¹) |
| 17 | Ex. VIII | 25 | 75 | 0.75 | do | 68 | 70 |
| 18 | Ex. VIII | 30 | 70 | 2.0 | do | 60 | 61 |
| 19 | Ex. VIII | 35 | 65 | 3.0 | do | 79 | 79 |
| 20 | Ex. VIII | 30 | 70 | 2.0 | N-tetradecyl-2-pyrrolidone | 73 | 77 |
| 21 | Ex. VIII | 30 | 70 | 2.0 | N-tetracedyl-2-piperidone | 94 | 98 |
| 22 | Ex. VIII | 30 | 70 | 2.0 | 2,2,6,6-tetra-methyl-4-piperidone-N-oxide | 128 | 138 |
| 23 | Ex. II | 20 | 80 | None | | >4,000 | (²) |
| 24 | Ex. I | 20 | 80 | None | | 4,860 | (²) |
| 25 | Ex. VIII | 30 | 70 | None | | >1,000 | >1,000 |
| 26 | Ex. VIII | 25 | 75 | None | | >1,000 | >1,000 |

¹ Free flowing.  ² No measurable flow.

EXAMPLES 27 AND 28

As mentioned above, polymer concentrates of the kind defined are useful, inter alia, as additives for lubricant formulations. A 10–30 lubricant (herein referred to as Lubricant A), suitable for use as an automotive engine oil and comprising a polymer concentrate in accordance with the present invention, was prepared and tested as follows and compared in performance with a high quality commercially available 10–30 automotive engine oil (herein referred to as Lubricant B) comprising a polymer ness scale (10=clean, 0=dirty) with the results set forth at Table III.

TABLE III

| | Example 27, Lubricant A | | | Example 28, Lubricant B | | |
|---|---|---|---|---|---|---|
| Test No. | 1 | 2 | 3 | 4 | 5 | 6 |
| Ring belt rating | 3.0 | 4.6 | 3.5 | 3.5 | 3.9 | 4.6 |
| Skirt rating | 9.0 | 9.3 | 8.9 | 9.3 | 9.3 | 9.3 |
| Undercrown rating | 4.6 | 6.7 | 5.7 | 5.7 | 5.8 | 5.6 |
| Mean | 5.5 | 6.9 | 6.0 | 6.1 | 6.3 | 6.5 |

From Table III it is seen that Lubricant A, comprising a polymer concentrate in accordance with the present invention, gave piston cleanliness performance at least as good as that given by Lubricant B, a high quality commercially available lubricant comprising a polymer concentrate not in accordance with the present invention.

As mentioned earlier, polymer concentrates in accordance with the present invention are useful as lubricant additive concentrates and the present invention includes within its scope lubricant compositions comprising such polymer concentrates. If desired, polymer concentrates in accordance with the present invention may contain additionally anti-oxidants, extreme pressure agents, anti-scuffing agents, anti-wear agents, anti-foam agents or other additives known to be suitable for inclusion in lubricant formulations.

I claim as my invention:

1. A mineral oil concentrate containing (a) 5–75% of an oil-soluble copolymer of (1) an ester of an unsaturated carboxylic acid and a saturated alkanol having from 4 to 30 carbon atoms and (2) a hydroxy containing ester of an unsaturated carboxylic acid and a polyhydric alcohol having from 2 to 6 carbon atoms said copolymer having an ester (1) to (2) ratio of from 10:1 to 2:1 and a molecular weight of from about 50,000 to 5,000,000, which copolymer causes said concentrate to have a tendency to increase in viscosity and gel and (b) from about 0.1% to 15% of a viscosity and gel inhibiting additive selected from the group consisting of a non-polymerizable nitrogen-containing heterocyclic compound having the formula:

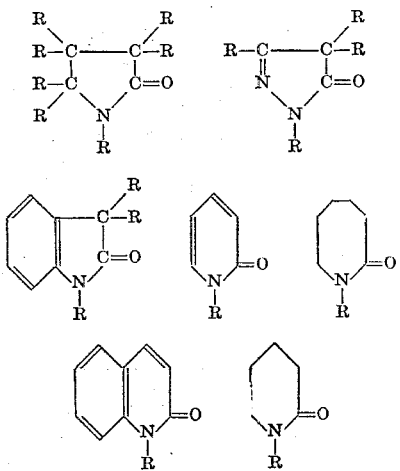

and mixtures thereof wherein R is selected from the group consisting of hydrogen, alkyl, aryl, alkaryl, aralykyl and cycloalkyl radicals.

2. The mineral oil concentrate of claim 1 wherein the nitrogen-containing heterocyclic compound is selected from the group consisting of 2-pyrrolidone, N-methyl-2-pyrrolidone, N-ethyl-2-pyrrolidone, N-butyl-2-pyrrolidone, N - isopropyl-2-pyrrolidone, N - tetradecyl-2-pyrrolidone, 5 - methyl-N-methyl-2-pyrrolidone, 1 - phenyl-3-methyl-5-pyrazolone, 1-phenyl-2,3-dimethyl-pyrazolone, 2-pyridone, N-methyl-pyridone, N-ethyl-pyridone, N-butyl-pyridone, N-isopropyl - pyridone, N-tetradecyl - 2 - piperidone, N-methyl-caprolactam, 3-ethyl-1-methyl-oxindole, N-methyl-quinolone and mixtures thereof.

3. The mineral oil concentrate of claim 1 wherein the copolymer is a copolymer of a mixture of dissimilar $C_{12-18}$ alkyl methacrylates and 2-hydroxyethyl methacrylate and the nitrogen-containing heterocyclic compound selected from the group consisting of 2-pyrrolidone, N - methyl-2-pyrrolidone, 5 - methyl-N-methyl-2-pyrrolidone, N-methyl caprolactam, N-tetradecyl-2-piperidone, and 3-ethyl-1-methyl oxindole.

4. The mineral oil concentrate of claim 1 wherein the copolymer is an ethoxylated copolymer of a mixture of dissimilar $C_{12-18}$ alkyl methacrylates and methacrylic acid and the nitrogen-containing heterocyclic compound is 2-pyrrolidone.

5. The mineral oil concentrate of claim 1 wherein the copolymer is a copolymer of lauryl methacrylate, stearyl methacrylate and 2-hydroxyethyl methacrylate and the nitrogen-containing heterocyclic compound is N-methyl-2-pyrrolidone.

6. The mineral oil concentrate of claim 1 wherein the copolymer is an ethoxylated copolymer of lauryl methacrylate, stearyl methacrylate and methacrylic acid and the nitrogen-containing heterocyclic compound is N-methyl-2-pyrrolidone.

References Cited

UNITED STATES PATENTS

| | | | |
|---|---|---|---|
| 2,963,468 | 11/1954 | Blair | 252—51.5 X |
| 3,007,784 | 11/1961 | Ebner | 252—51.5 X |
| 3,146,203 | 8/1964 | Frew | 252—51.5 X |
| 3,152,141 | 10/1964 | Tousignant | 252—51.5 X |
| 3,198,739 | 8/1965 | Richards et al. | 252—56 |
| 3,224,975 | 12/1965 | Hinkamp | 252—51.5 |
| 3,277,003 | 10/1966 | Gragson | 252—32.7 |

DANIEL E. WYMAN, Primary Examiner.

PATRICK P. GARVIN, Examiner.